Jan. 26, 1960 W. HARGREAVES 2,922,902
ELECTRICAL MOTOR STRUCTURE
Filed April 24, 1956
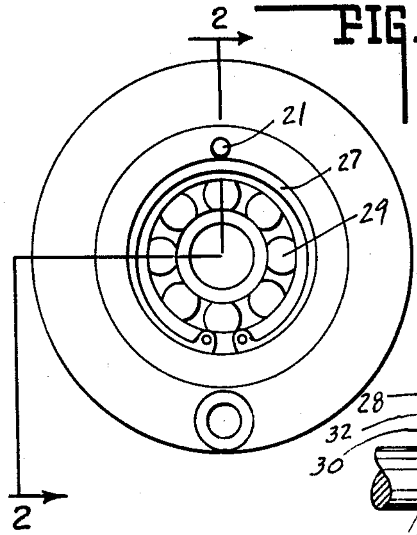
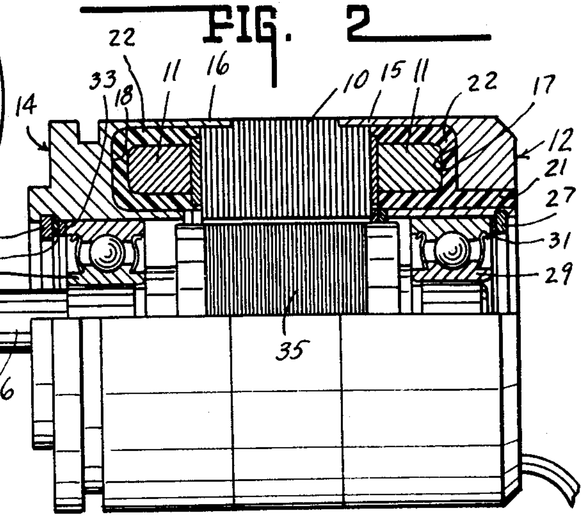
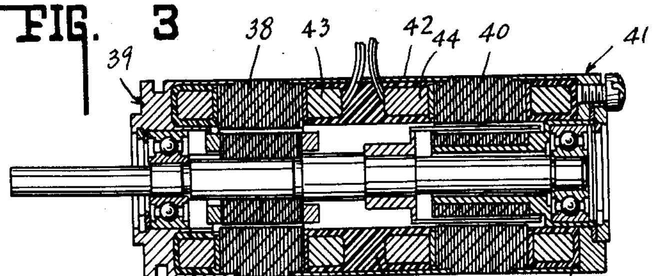
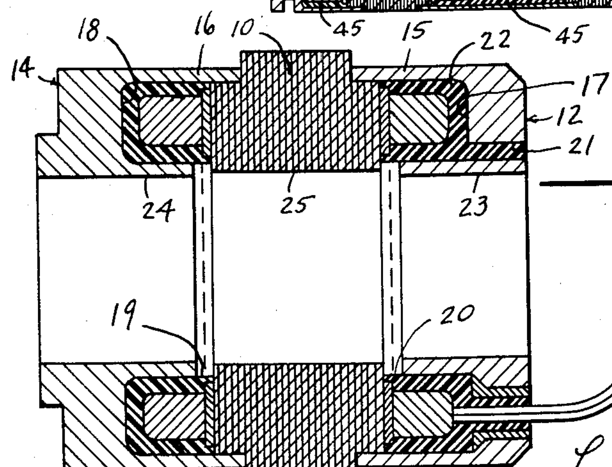
INVENTOR.
WILLIAM HARGREAVES
BY
Lockwood, Galt, Woodard & Smith
ATTORNEYS.

United States Patent Office 2,922,902

Patented Jan. 26, 1960

2,922,902

ELECTRICAL MOTOR STRUCTURE

William Hargreaves, Jenkintown, Pa., assignor, by mesne assignments, to Daystrom, Incorporated, Murray Hill, N.J., a corporation of New Jersey Application April 24, 1956, Serial No. 580,302

11 Claims. (Cl. 310—43)

This invention relates generally to electrical motor structures and more particularly it relates to an electrical motor structure and a method of assembly especially adapted for manufacture with high standards of mechanical and electrical accuracy.

Conventional electrical motors usually comprise a shell within which is supported the stator core and coils. The shell is provided with end caps having armature supporting bearings, the end caps being clamped to the shell by means of bolts extending from one cap to the other.

Present day control apparatus of certain types utilize small motors and/or motor generators which are in the category of precision instruments. Mechanically, such motors and generators must be manufactured to high standards of precision because the electrical characteristics of such motors and generators require such precision in order to provide the electrical operating characteristics necessary to carry out the functions of the particular control circuit. Accordingly, motors and generators having the conventional mechanical design become exceedingly expensive to manufacture and exceedingly complex with respect to manufacturing techniques.

The principal object of this invention is to provide an electrical motor structure of relatively simple character and yet capable of being manufactured to high standards of mechanical and electrical accuracy.

Another object of this invention is to provide a relatively simple method of assembly for electrical motor structures of the character set forth in the preceding paragraph.

In accordance with this invention there is provided an electrical motor structure comprising a stator having an annular core and windings supported therein, and end caps adapted to be mounted on and secured to said stator, said end caps including housing portions surrounding the coil ends which protrude from the stator, thereby to permit use of a filling or bonding material within the housing and around the coil ends which serves to lock the end caps to the stator and to form a self-supporting structure.

In accordance with a further feature of this invention, the electrical motor structure described herein may be assembled and finished by mounting the end caps on the ends of the stator, introducing a bonding material into the spaces between the end caps and the coil ends, spinning the assembly and heating the bonding material to distribute it throughout said spaces, cooling or curing the bonding material, and finally machining all of the internal and external diameters of the caps and stator, thereby to make said diameters accurately concentric with one another.

The full nature of the invention will be understood from the accompanying drawings and the following description and claims:

Fig. 1 is an end elevation of the motor structure provided in accordance with this invention;

Fig. 2 is a cross section taken on line 2—2 of Fig. 1;

Fig. 3 is a longitudinal cross section of a motor generator embodying the important features of the invention shown in Figs. 1 and 2; and Fig. 4 is a longitudinal cross section of the motor structure shown in Fig. 2 illustrating the structure as it would be prior to the final machining of the various external and internal diameters of the end caps and stator core.

Referring to the drawings, this invention provides an electrical motor structure comprising a conventional stator core 10 made up of annular laminations slotted to receive conventional stator coils having end portions 11 which protrude longitudinally of the core. The outer diameters of several of the end laminations of core 10 may be reduced in order to receive the end caps 12 and 14 with the shell portions 15 and 16 thereof fitting over the end laminations of core 10, as shown in Fig. 4.

It will be noted that the shell portions 15 and 16 are of greater thickness than illustrated in Fig. 2. Also, the external and internal diameters of the end caps and the stator core are greater or less, repectively, than those shown in Fig. 2 indicating that these internal and external diameters may be machined after assembly.

End caps 12 and 14 are formed to provide annular channels 17 and 18, respectively, which are substantially larger in cross section than the cross sections of the coil ends 11, thereby creating spaces around the coil ends.

After caps 12 and 14 are mounted on the stator core the assembly, as shown in Fig. 4, may be mounted in a fixture adapted to clamp the end caps to the stator core. The fixture and the assembly may then be rotated about a vertical axis through the center of the assembly. A thermo-setting bonding material may then be introduced into the assembly at points such, for example, as 19 and 20, whereby centrifugal forces cause the bonding material to flow into the spaces 17 and 18 around the coil ends 11. Simultaneously, heat may be applied to the entire assembly and the center of the assembly may be kept free of bonding material by providing a bleed hole 21 at the proper distance from the center of rotation of the assembly. Introduction of bonding material may be continued until it begins to flow through the bleed hole 21 and in this manner the inside diameter which the bonding material will occupy can be controlled.

After the bonding material is completely cured, it forms a bonding element 22 between each cap and each end of the core 10. The assembly as illustrated in Fig. 4 then may be removed from the spinning fixture for machine finishing. The assembly may be mounted in the lathe, for example, on its approximate longitudinal axis and the external diameters of core 10 and caps 12 and 14 may be finished down to a uniform diameter throughout the length of the assembly, as shown in Fig. 2.

The same is true of the internal diameters at 23, 24, and 25 of the caps 12 and 14, and the stator core 10, respectively.

Internal grooves may be machined in the end portions of caps 12 and 14 to receive snap rings 27 and 28 which serve to lock conventional ball bearings 29 and 30 within caps 12 and 14. Washers 31 and 32 and, if desired, an extra washer 33 may be provided for accurately positioning bearings 29 and 30. From the foregoing description, it will be apparent that the bonding element 22 will serve to fasten and support the end caps 12 and 14 with respect to core 10. The end caps, in turn, serve to support the bearings 29 and 30 which, in turn, serve to support the rotor 35 and its shaft 36. By reason of the fact that all of the external and internal diameters are machined after the end caps are bonded to the core 10, the rotor 35 is positioned with extreme accuracy with respect to core 10. This is true with respect to centering of the rotor and also with respect to longitudinal alignment of the rotor with the core. It will be noted that longitudinal alignment is controlled by the positioning of snap rings 27 and 28 and washers 31, 32 and 33. Further, the machining of the grooves which receive these snap rings and washers is not performed until after the end caps are assembled on the core.

Fig. 3 illustrates a modification of the invention, wherein a motor and a generator, for example, may be assembled on a common shaft as a unitary structure. There may be provided a stator core 38 for a motor. An end cap assembly 39 may be mounted on one end of this core in exactly the same manner as described in connection with Figs. 2 and 4.

There may also be provided a stator core 40 for a generator having an end cap assembly 41 similar in all essential respects to end cap 12, for example, in Figs. 2 and 4, but has an inside diameter slightly larger than end cap 39. Cores 38 and 40 may then be joined to one another by means of a cylindrical shell 42 which surrounds the end coils 43 of motor core 38 and end coils 44 of generator core 40. The entire assembly may then be mounted in a fixture for introduction of the bonding material 45 into the spaces surrounding the end coils within the end caps 39 and 41 and also within the cylindrical shell member 42. As previously described in connection with the embodiment of Fig. 4, heating and spinning the assembly produces flow of the bonding material so that the center of the assembly is kept free of bonding material, centrifugal forces causing the filling to assume an inside diameter substantially that of the enlarged inside diameter of end cap 41. After the bonding material 45 has been cured, the assembly may then be machined in the same manner as described in connection with the assemblies illustrated in Figs. 2 and 4.

The invention claimed is:

1. A motor structure comprising a stator having an annular core and windings supported thereon with coil ends protruding therefrom, an end cap mounted to each end of said core, each end cap including an outer shell member fitted to one end of said core and an annular housing surrounding said coil ends in spaced relation thereto, a filling of bonding material filling the space between said housing and said coil ends and having a predetermined inside diameter established by a bleed hole in one of said end caps, said filling constituting a means of securing said caps to said core, and armature supporting bearings mounted within each of said caps.

2. A motor structure comprising a stator having an annular core and windings supported thereon with coil ends protruding therefrom, an end cap mounted to each end of said core, each end cap including a portion embracing one end of said core and an annular housing surrounding said coil ends in spaced relation thereto, and a filling of bonding material filling the space between said housing and said coil ends and having a predetermined inside diameter established by a bleed hole in one of said end caps, said filling constituting a means of securing said caps to said core.

3. A motor structure comprising a stator having an annular core and windings supported thereon with coil ends protruding therefrom, an end cap mounted to each end of said core, each end cap including an outer shell member fitted to one end of said core and an annular housing surrounding said coil ends in spaced relation thereto, and means for securing said caps to said core consisting of a filling of cured thermosetting bonding material filling the space between said housing and said coil ends and having a predetermined inside diameter established by a bleed hole in one of said end caps.

4. A motor structure comprising a stator having an annular core, an end cap mounted to each end of said core, each end cap including an outer shell member fitted to the periphery of one end of said core and an annular housing in spaced relation thereto, a filling of bonding material filling any empty space between said housing and said core and having a predetermined inside diameter established by a bleed hole in one of said end caps, said filling constituting a means of securing said caps to said core, and armature supporting bearings mounted within each of said caps.

5. A motor structure comprising a stator having an annular core, an end cap mounted to each end of said core, each end cap including a portion embracing and engaging one end of said core and an annular housing in spaced relation thereto, and a filling of bonding material filling any empty space between said housing and said core, and having a predetermined inside diameter established by a bleed hole in one of said end caps, said filling constituting a means of securing said caps to said core.

6. A motor structure comprising a stator having an annular core, a first end cap mounted to one end of said core and including a portion embracing said core and an annular housing in spaced relation thereto, a second end cap mounted on the other end of said core, one of said caps having an aperture of larger inside diameter than that of said stator and a filling of bonding material filling any empty space between said housing and said core, said filling constituting means of securing said caps to said core, and having a predetermined inside diameter established by said end cap aperture.

7. A method of assembling an electrical motor having a stator with coil ends protruding therefrom and end caps which include housing space for said coil ends and bearing supporting surfaces, comprising the steps of mounting said end caps on the ends of said stator, filling said housing spaces to a predetermined degree with a bonding material, simultaneously spinning said assembly and heating the same to distribute said material into said spaces, simultaneously bleeding off any excess bonding material, cooling said material to create a bond between said caps and said stator, and finally machining internal and external diameters of said caps and stator.

8. A method of assembling an electrical motor having a stator and with coil ends protruding therefrom and end caps which include housing space adjacent said coil ends and bearing supporting surfaces, comprising the steps of mounting said end caps on the ends of said stator, filling said housing spaces to a predetermined degree with a bonding material simultaneously by spinning said assembly to distribute said material until said filling has an inside diameter determined by means for bleeding excess filling outside said assembly, curing said material to create a bond between said caps and said stator, and finally machining internal and external diameters of said caps and stator.

9. A method of assembling an electrical motor having a stator core and end caps which include housing space adjacent said core and bearing supporting surfaces, comprising the steps of mounting said end caps on the ends of said stator, filling said housing spaces to a predetermined degree with a bonding material, simultaneously spinning said assembly and heating the same to distribute said material into said spaces, and cooling said material to create a bond between said caps and said stator.

10. A method of assembling an electrical motor having a stator with coil ends protruding therefrom and end caps which include housing space for said coil ends and bearing supporting surfaces, comprising the steps of mounting said end caps on the ends of said stator, filling said housing spaces to a predetermined degree with a bonding material simultaneously by spinning said assembly about the axis defined by said stator until said filling has an inside diameter determined by means for bleeding excess filling outside said assembly, and then curing said material to create a bond between said caps and said stator.

11. A method of assembling an electrical motor having stator and end caps which include housing space adjacent said core and bearing supporting surfaces, comprising the steps of mounting said end caps on the ends of said stator, filling said housing spaces with a bonding material by spinning said assembly to distribute said material until said filling has an inside diameter determined by a central aperture in one of said caps for bleeding excess filling outside said assembly, curing said material to create a bond between said caps and said stator, and finally machining internal and external diameters of said caps and stator.

References Cited in the file of this patent

UNITED STATES PATENTS

| | | |
|---|---|---|
| 2,393,045 | Hotcher | Jan. 15, 1946 |
| 2,668,925 | Bloser | Feb. 9, 1954 |
| 2,698,911 | Schaefer | Jan. 4, 1955 |
| 2,721,280 | Dills | Oct. 18, 1955 |